(12) United States Patent
Lv

(10) Patent No.: US 11,875,164 B2
(45) Date of Patent: Jan. 16, 2024

(54) METHOD AND SYSTEM TO LAUNCH LOCAL APPLICATIONS SEAMLESSLY FROM A REMOTE DESKTOP

(71) Applicant: VMware, Inc., Palo Alto, CA (US)

(72) Inventor: Lin Lv, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/652,974

(22) Filed: Mar. 1, 2022

(65) Prior Publication Data

US 2023/0221966 A1 Jul. 13, 2023

(30) Foreign Application Priority Data

Jan. 11, 2022 (WO) ................ PCT/CN2022/071233

(51) Int. Cl.
*G06F 9/451* (2018.01)
*G06F 9/445* (2018.01)

(52) U.S. Cl.
CPC .............. *G06F 9/452* (2018.02); *G06F 9/445* (2013.01)

(58) Field of Classification Search
CPC .................................. G06F 9/452; G06F 9/445
See application file for complete search history.

(56) References Cited

U.S. PATENT DOCUMENTS

| 8,970,450 | B2 * | 3/2015 | Momchilov | ............ | H04L 67/08 |
| | | | | | 709/219 |
| 2009/0003172 | A1 * | 1/2009 | Yahata | ................... | G11B 19/10 |
| | | | | | 369/53.41 |
| 2012/0005269 | A1 * | 1/2012 | Janssen | .................. | G06F 3/0481 |
| | | | | | 709/203 |
| 2012/0226742 | A1 * | 9/2012 | Momchilov | ............ | G06F 3/048 |
| | | | | | 709/203 |
| 2012/0311457 | A1 * | 12/2012 | O'Gorman | .............. | G06F 9/452 |
| | | | | | 715/740 |
| 2013/0031618 | A1 * | 1/2013 | Momchilov | ............ | H04L 67/10 |
| | | | | | 726/7 |
| 2014/0026057 | A1 * | 1/2014 | Kimpton | ................. | G06F 9/451 |
| | | | | | 715/733 |

(Continued)

OTHER PUBLICATIONS

VMware, VMware Horizon Client for Windows User Guide, VMware Horizon Client for Windows 2111, https://docs.vmware.com/en/VMware-Horizon-Client-for-Windows/2111/horizon-client-windows-user/GUID-7CD55F1B-1D36-4FFF-92CF-E14DB1B44A90.html [retrieved Feb. 28, 2022] 62 pages.

(Continued)

*Primary Examiner* — Vivek Srivastava
*Assistant Examiner* — Wuji Chen
(74) *Attorney, Agent, or Firm* — Patterson + Sheridan, LLP

(57) ABSTRACT

The disclosure provides a method for launching one or more local applications seamlessly from a remote desktop. The method generally includes sending, from a client device to a connection server, redirected local application information associated with one or more local applications of the client device; receiving a selection, from a user of the client device via a context menu of a file located on a remote device running a remote desktop, of a local application of the one or more local applications to open the file; receiving, by the client device from the remote desktop, a request for the client device to launch the local application and load the file; and displaying the local application in a window displayed on the client device.

17 Claims, 8 Drawing Sheets

(56) References Cited

U.S. PATENT DOCUMENTS

| | | | | |
|---|---|---|---|---|
| 2016/0132806 A1* | 5/2016 | To | ................... | G06Q 10/06313 705/7.23 |
| 2020/0218429 A1* | 7/2020 | Yu | ....................... | G06F 3/0481 |
| 2021/0397464 A1* | 12/2021 | Lv | ....................... | G06F 3/0481 |
| 2022/0191288 A1* | 6/2022 | Harshith | ................ | G06F 9/452 |

OTHER PUBLICATIONS

VMware, VMware Horizon Client for Windows User Guide, VMware Horizon Client for Windows 2103, https://docs.vmware.com/en/VMware-Horizon-Client-for-Windows/2103/horizon-client-windows-user/GUID-CFB7E9B1-63E0-418A-8814-572296507783.html [retrieved Feb. 28, 2022] 63 pages.

\* cited by examiner

METHOD AND SYSTEM TO LAUNCH LOCAL APPLICATIONS SEAMLESSLY FROM A REMOTE DESKTOP

RELATED APPLICATIONS

This application claims benefit of and priority to International Patent Cooperation Treaty Application No. PCT/CN2022/071233, filed Jan. 11, 2022, which is herein incorporated in its entirety by reference for all purposes.

INTRODUCTION

In a virtual desktop infrastructure (VDI) environment, a local client device (e.g., a personal computer (PC) or mobile device) can access a remote virtual or physical desktop or remote application that is running on a remote device and displayed at the local client device. For instance, a virtual desktop may be hosted on a central infrastructure known as virtual desktop infrastructure (VDI), and may be rendered on a client device using a remote display protocol. At the client device, a user may interact with the virtual desktop using peripheral devices (e.g., keyboard and/or mouse) associated with the client device, and operating system (OS) events generated based on the user's inputs are captured by a VDI client (e.g., a user-side interface of the remote desktop) of the client device and redirected from the client device to the remote device on which the virtual desktop is located.

An end user (e.g., a user of a local client device) of a remote desktop may not only use applications installed on the remote desktop, but also use local applications (e.g., installed on the local client device) to perform some functionality. Use of local applications may leverage the computing resources on both remote desktop and the local client device. Use of the computing resources of both devices may increase efficiency. In addition, some applications that the user desires to use may be installed only on the local client device. In an illustrative example, a user who is editing documents in the remote desktop using a word processing application of the remote desktop may want to use a particular local application to edit a video clip since the video editing application is only installed on the local client device.

In some cases, if a user working on the remote desktop wants to open a file on the remote desktop using a local application, the user must first transfer the remote file to the local client device, switch to the local desktop, and open the file from the local desktop with the desired local application. Transferring files and switching between the remote and local desktops takes time and reduces efficiency for the user. Further, for a user that is using only one display screen/monitor, switching between remote and local desktop provides a poor user experience and further reduces the user's productivity.

Accordingly, there is a need in the art for improved remote display techniques to launch a remote file with a local application.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method for launching one or more local applications seamlessly from a remote desktop. The method generally includes sending, from a client device to a connection server, redirected local application information associated with one or more local applications of the client device; receiving a selection, from a user of the client device via a context menu of a file located on a remote device running a remote desktop, of a local application of the one or more local applications to open the file; receiving, by the client device from the remote desktop, a request for the client device to launch the local application and load the file; and displaying the local application in a window of the remote desktop displayed on the client device.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for launching one or more local applications seamlessly from a remote desktop. As used herein, a local application may refer to a software application installed on a client device. Aspects allow a user to launch a local application from within the remote desktop as though the local application were an application installed on the remote desktop. In an illustrative embodiment, a user of the remote desktop can open a file on the remote desktop by selecting the desired local application from a context menu associated with the file. A context menu is a menu in a graphical user interface (GUI) that appears upon a user interaction (e.g., accessed by double-clicking or right-clicking a file icon via a mouse or touchpad operation). A context menu offers a limited set of selections that are available for the file.

In some embodiments, a local client device, remote desktop, IT service, and connection server perform operations to enable launching of one or more local applications seamlessly from within the remote desktop. The IT service may run on a server between the local client device and the remote desktop. The IT service may be used to verify the local client device. For example, the IT service may maintain a list of devices associated with an authenticated user of the remote desktop. Accordingly, the IT service can verify the local client device is an enrolled device when the local client device requests to configure local applications to launch from the remote desktop. In some embodiments, after the local client device connects to the remote desktop, the local client device configures one or more local applications, via the connection server, to be launched from within the remote desktop. The remote desktop may register the one or more local applications with the remote desktop as a file handler for one or more file types. The remote desktop may add the one or more local applications to one or more context menus for one or more remote desktop files of the one or more file types. Once the one or more local applications are added to the context menu for a remote desktop file, the user can then navigate to the context menu for the file to select the local application to launch the file, such as via an "open with" selection from the context menu. The remote desktop may then redirect the file to the local client device where the local application may then be launched and the redirected file loaded. In some embodiments, the local application handling the remote desktop file displays as a reverse seamless window on the remote desktop, giving the user the illusion that the local application is launched on the remote desktop.

Figure 1:
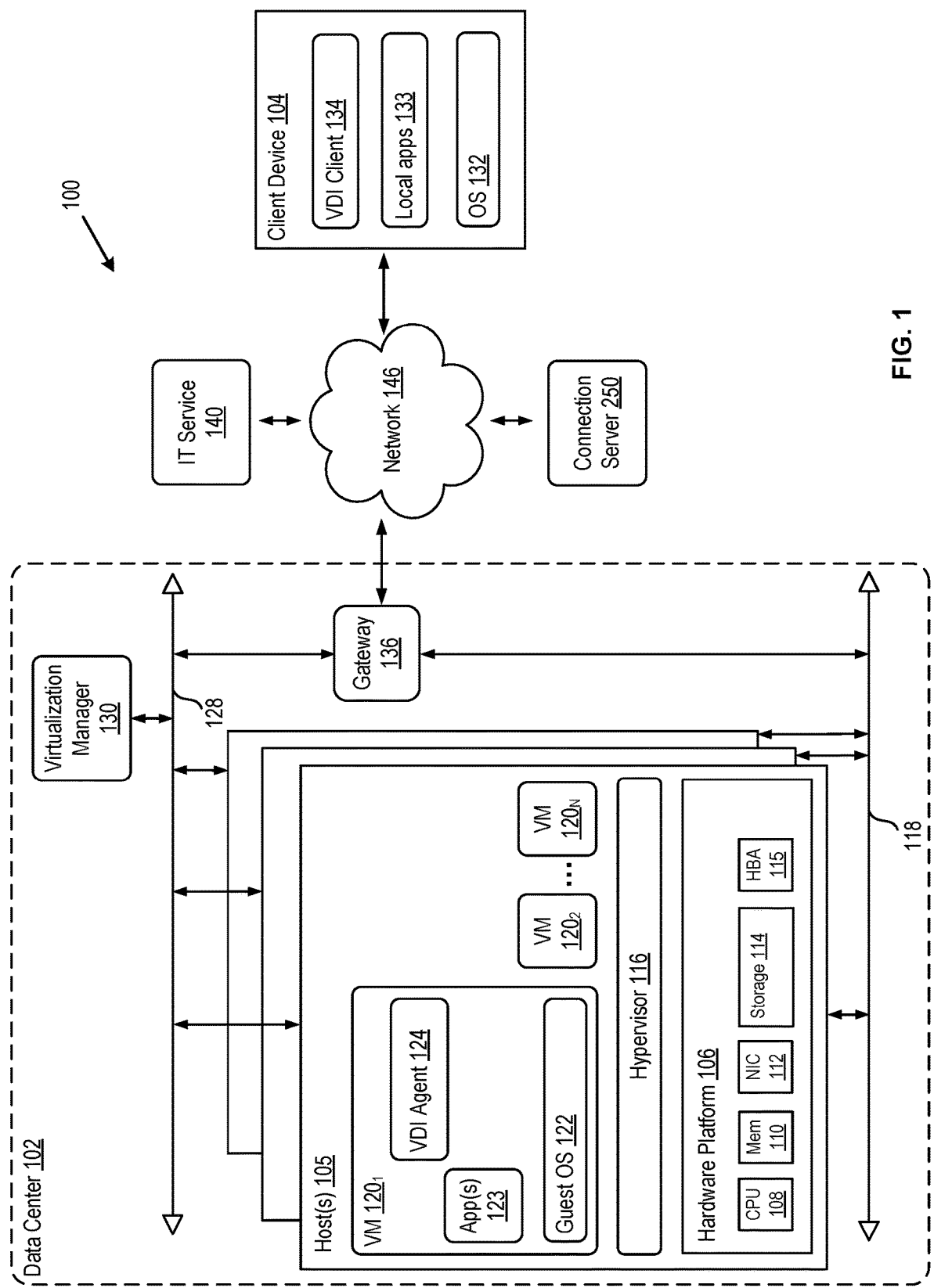
FIG. 1 depicts a block diagram of a virtualized desktop infrastructure system in which one or more embodiments of the present disclosure may be implemented.

FIG. 1 depicts a block diagram of a VDI system 100 in which one or more embodiments of the present disclosure may be implemented. VDI system 100 comprises a client device 104, an IT service 140, one or more connection servers 150, and a data center 102, connected by a network 146. Network 146 may be, for example, a direct link, a local area network (LAN), a wide area network (WAN) such as the Internet, another type of network, or any combination thereof.

Client device 104 is a physical device, such as a general purpose desktop computer or mobile computer. A mobile computer may be, for example, a laptop, a mobile phone, or a tablet computer. Client device 104 includes VDI client 134, operating system (OS) 132, and local applications 133. In certain embodiments, VDI client 134 runs on top of OS 132. OS 132 may be a standard, commodity operating system.

VDI client 134 is a user-side interface of a virtualized desktop running on one of virtual machines (VMs) 120. As used herein, a "virtualized desktop" or "remote desktop" is a desktop running on one of VMs 120 that is displayed remotely on client device 104, as though the remote desktop were running on client device 104. One example of a remote desktop application is Horizon Client™ made commercially available from VMware, Inc. of Palo Alto, California By opening VDI client 134, a user of client device 104 accesses, through network 146, a remote desktop running in remote data center 102, from any location, using client device 104. Frames of the remote desktop running on VM 120 are transmitted to VDI client 134 at a certain frame rate using a remote display protocol such as VMware® Blast™, or Microsoft® Remote Desktop Protocol (RDP)™. After transmission, the frames are displayed on client device 104 for interaction by a user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

Client device 104 may include one or more local applications 133 installed thereon. Local applications 133 may include any software program. Illustrative examples of local applications include word processing applications, image and/or video editing tools, and the like. In some embodiments, client device 104 may configure one or more of local applications 133 as file-handler for one or more file types on a remote desktop (e.g., VM $120_1$).

As the user interacts with the virtual desktop, such as using a mouse and keyboard, the user input is redirected by VDI client 134 to VDI agent 124.

Data center 102 includes host(s) 105, a virtualization manager 130, a gateway 136, a management network 128, and a data network 118. Although the management and data network are shown as separate physical networks, in some implementations the management network is logically isolated from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to 120N (collectively referred to as VMs 120 and individually referred to as VM 120) that run concurrently on the same host 105. Hypervisor 116 may run on top of the OS in host 105. In some embodiments, hypervisor 116 can be installed as system level software directly on hardware platform 106 of host 105 (often referred to as "bare metal" installation) and be conceptually interposed between the physical hardware and the guest OSs 122 executing in VMs 120. In some implementations, hypervisor 116 may comprise system level software as well as a "Domain 0" or "Root Partition" VM, which is a privileged machine that has access to the physical hardware resources of host 105. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123 and a VDI agent 124. Application(s) 123 and VDI agent 124 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

In some embodiments, VM $120_1$ registers one or more of local applications 133 that are configured as file-handlers for one or more file types as the file-handler one or more files of the one or more file types. VM $120_1$ may add the one or more local applications 133 to a context menu for each of the one or more files. In some embodiments, VM $120_1$ is configured to redirect a file to client device 104 when the user opens a remote desktop file using a local application selected from the context menu for the file. Client device 104 may launch the selected local application and load the remote desktop file. VM $120_1$ and client device 104 may display the local application as a reverse seamless window in the remote desktop.

Hardware platform 106 of each host 105 includes components of a computing device such as one or more processors (CPUs) 108, memory 110, a network interface card including one or more network adapters, also referred to as Network Interface Cards (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 105 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 105 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as management network 128, and carries out administrative tasks for data center 102 such as managing hosts 105, managing VMs 120 running within each host 105, provisioning VMs 120, migrating VMs 120 from one host 105 to another host, and load balancing between hosts 105. Virtualization manager 130 may be a computer program that resides and executes in a server in data center 102 or, alternatively, virtualization manager 130 may run as a virtual appliance (e.g., a VM 120) in one of hosts 105. One example of a virtualization manager is the vCenter Server™ product made available from VMware, Inc. of Palo Alto, California.

Gateway 136 provides VMs 120 and other components in data center 102 with connectivity to network 146. Gateway 136 may manage external public internet protocol (IP) addresses for VMs 120, route traffic incoming to and outgoing from data center 102, and provide networking services, such as firewalls, network address translation (NAT), dynamic host configuration protocol (DHCP), and load balancing. Gateway 136 uses data network 118 to transmit data network packets to hosts 105. Gateway 136 may be a VCI, a physical device, or a software module running within host 105. Gateway 136 may include two gateways: a management gateway for management network 128 and a data gateway for data network 118.

IT service 140 may run on an IT server between data center 102 and client device 104. In some embodiments, IT service 140 may run within data center 102. In some embodiments, IT service 140 is in communication with data center 102 and client device 104 via network 146. In some embodiments, IT service 140 is a software-as-a-service (SaaS) application. One example of an IT service is Workspace ONE™ made commercially available from VMware, Inc. of Palo Alto, California. As discussed in more detail below, IT service 140 may maintain or have access to a database of devices associated with users of a remote desktop that have previously been enrolled. Enrolling the devices may include authenticating the devices and adding the device to the database as an approved device associated with the user for accessing the remote desktop.

Connection server(s) 150 may run between data center 102 and client device 104. In some embodiments, connection server(s) 150 are in communication with data center 102 and client device 104 via network 146. Connection server(s) 150 may be responsible for authenticating users, managing remote desktop and application sessions, establishing secure connections between users and remote desktops and applications, and setting and applying policies for remote desktop sessions. In some embodiments, a connection server 150 may be configured to communicate with IT service 140 to verify a client device 104. In some embodiments, a connection server 150 may be configured to receive and store local application information from client device 104, and the local application information may be retrieved from connection server 150 by a remote desktop in data center 102.

Figure 2:
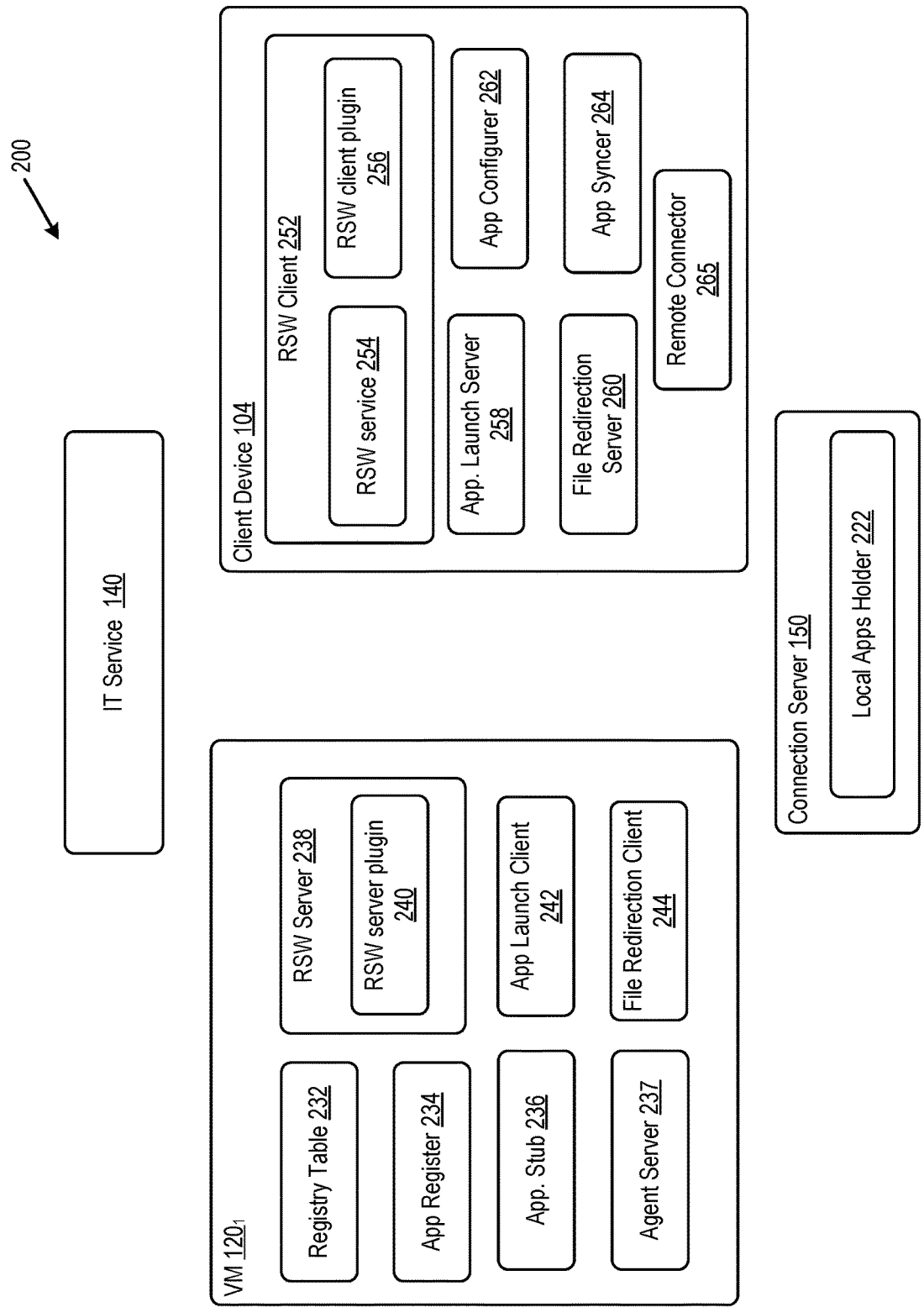
FIG. 2 illustrates an example client device, remote desktop, information technology (IT) service, and connection server configured for launching local applications seamlessly from the remote desktop, according to an example embodiment of the present disclosure.

FIG. 2 illustrates an example client device 104, remote desktop (e.g., VM $120_1$), IT service 140, and connection server 150 configured for launching local applications seamlessly from the remote desktop, according to an example embodiment of the present disclosure. Details of the components illustrated in FIG. 2 may be further understood with respect to the example operations 300 in the call flow diagram illustrated in FIGS. 3A-3D and described in more detail below.

As shown in FIG. 2, connection server 150 may include a local application holder 222. Connection server 150 may manage a connection between VM $120_1$, IT service 140, and client device 104. In some embodiments, connection server 150 receives a request from client device 104 to configure one or more local application 133 to be registered as a file-handler and added to a context menu to launch one or more file types of VM $120_1$. Connection server 150 may communicate with IT service 140 to verify client device 104. Connection server 150 may receive information about local applications 133 and store the information with local applications holder 222. Local applications holder 222 may be a process that persists the information about local applications 133. The information about local applications 133 may later be retrieved by VM 120₁.

IT service 140 may manage access and security for VDI system 100. IT service 140 may maintain or have access to a database of devices enrolled for a user. Thus, when IT service 140 receives a query from connection server 150 when client device 104 attempts to access the remote desktop, IT service 140 can determine whether client device 104 is enrolled in the database to verify the client device 104 to connection server 150.

Client device 104 includes reverse seamless window client 252, application launch server 258, application configurer 262, file redirection server 260, application syncer 264, and remote connector 265.

Remote connector 265 may work with agent server 237 of VM 120₁ to establish a remote desktop connection.

Application configurer 262 may implement a user interface (UI) on the client device 104. Application configurer 262 may allow the user of client device 104 to input the local applications 133 that the user wants to be able to use on the remote desktop. Application configurer 262 may send a request to connection server 150 to configure the local application 133 to launch from within the remote desktop, prompting connection server 150 to verify client device 104 with IT service 140. Application configurer 262 may pass information (e.g., referred to herein as "redirected local app information") to application syncer 264 about the one or more local applications 133 to be registered at the remote desktop. In some embodiments, the information about the one or more local applications 133 includes at least the application name and application path (e.g., the installation executable path for the application). In some embodiments, the information about the one or more local applications 133 includes additional information such as application version and/or application icon.

Application syncer 264 communicates with connection server 150 to store (e.g., if the user is configuring the local applications for the first time) or update (e.g., if the user is changing existing information) the redirected local app information at connection sever 150. Application syncer 264 may monitor for changes of redirected local applications on client device 104 and update connection server 150 when changes are detected. For example, changes to the local applications 133 may be due to uninstallation or upgrade of the local application. In some embodiments, application syncer 264 may detect a change to a local application 133 during a period that client device 104 is not connected to the remote desktop. The next time client device 104 connects to the remote desktop, application syncer 264 may provide the updated redirected local app information to the remote desktop.

Application launch server 258 may work with application launch client 242 on VM 120₁ to launch a local application when the local application is selected (e.g., from a context menu) to open a file on the remote desktop. In some embodiments, application launch server 258 receives an application name, application path, and a file name of the redirected remote file from application launch client 242. Application launch server 258 may receive a notification from file redirection server 260 of a mapped file path (e.g., file location and file name). Application launch server 258 can then launch the local application based on the application name, application path, and file path received from application launch client 242 and the mapped file path received from file redirection server 260.

File redirection server 260 may work with file redirection client 244 on VM 120₁ to mount a file from the remote desktop to client device 104 when the user selects a local application to open the file on the remote desktop (e.g., from a context menu of the file). In some embodiments, file redirection server 260 and file redirection client 244 leverage client drive redirection (CDR) to mount the file from the remote desktop to client device 104. In some embodiments, file redirection server 260 receives an instruction from file redirection client 244 to mount a remote desktop file on client device 104. File redirection server 260 may work with file redirection client 244 to map the remote desktop file to client device 104. For example, file redirection server 260 may map the remote desktop file to local OS 132 and inform application launch server 258 of the mapped file path.

RSW client 252 includes RSW service 254 and RSW client plugin 256. RSW client 252 works with RSW server 238 on VM 120₁ to display the selected local application 133 in the remote desktop as a reverse seamless window. RSW service 254 tracks window events (e.g., window create, window move, window remove, window attribute change, window order change) in local OS 132. RSW client plugin 256 obtains the window events from RSW service 254 and sends the window events to RSW server 238. RSW client plugin 256 receives uncovered display regions from RSW server 238. RSW client 252 then displays the uncovered display regions of the local application window in the RSW window.

On the remote desktop-side, VM 120₁ includes reverse seamless window server 238, application launch client 242, application stub process 236, file redirection client 244, registry table 232, application register 234, and agent server 237.

Agent server 237 may work with remote connector 265 of client device 104 to establish a remote desktop connection.

Application register 234 registers local applications as a file-handler for one or more file types. In some embodiments, application register 234 retrieves redirected local app information from connection server 150 and registers one or more local applications 133 based on the redirected local app information. In some embodiments, application register 234 receives updated redirected local app information from connection server 150. In some embodiments, application register 234 adds or removes local applications 133 to/from registry table 232 based on the redirected local app information.

Application stub process 236 can retrieve redirected local app information from registry table 232. In some embodiments, application stub process 236 retrieves one or more of the application path, application name, and the file path (e.g., file location on the remote desktop and file name) from registry table 232 and passes it to application launch client 242.

Application launch client 242 may work with application launch server 258 on client device 104 to launch a local application when the local application is selected (e.g., from a context menu) to open a file on the remote desktop.

In some embodiments, application launch client 242 receives the application name, application path, and file name of the redirected remote file from application stub process 236. Application launch client 242 may pass the application name, application path, and file name to application launch server 258. Application launch client 242 may pass the file path to file redirection client 244. Application launch client 242 may instruct file redirection client 244 to share the file with client device 104.

File redirection client 244 may work with file redirection server 260 on client device 104 to mount a file from the remote desktop to client device 104 when the user selects a local application to open the file on the remote desktop (e.g., from a context menu of the file). In some embodiments, file redirection client 244 receives a file path from application launch client 242. In some embodiments, file redirection server 260 and file redirection client 244 leverage CDR to mount the file from the remote desktop to client device 104. In some embodiments, file redirection client 244 sends an instruction to file redirection server 260 to mount a remote desktop file on client device 104. File redirection client 244 may work with file redirection server 260 to map the remote desktop file to client device 104 so that the local application can access and open it.

RSW server 238 includes RSW server plugin 240. RSW server plugin 240 may receive a window event from RSW client plugin 256 and create a corresponding RSW window in the remote desktop. RSW server plugin 240 sends uncovered display regions to RSW client plugin 256.

FIGS. 3A-3D illustrate a call flow diagram with example operations 300 for launching local applications seamlessly from a remote desktop, according to an example embodiment of the present disclosure.

Figure 3A:
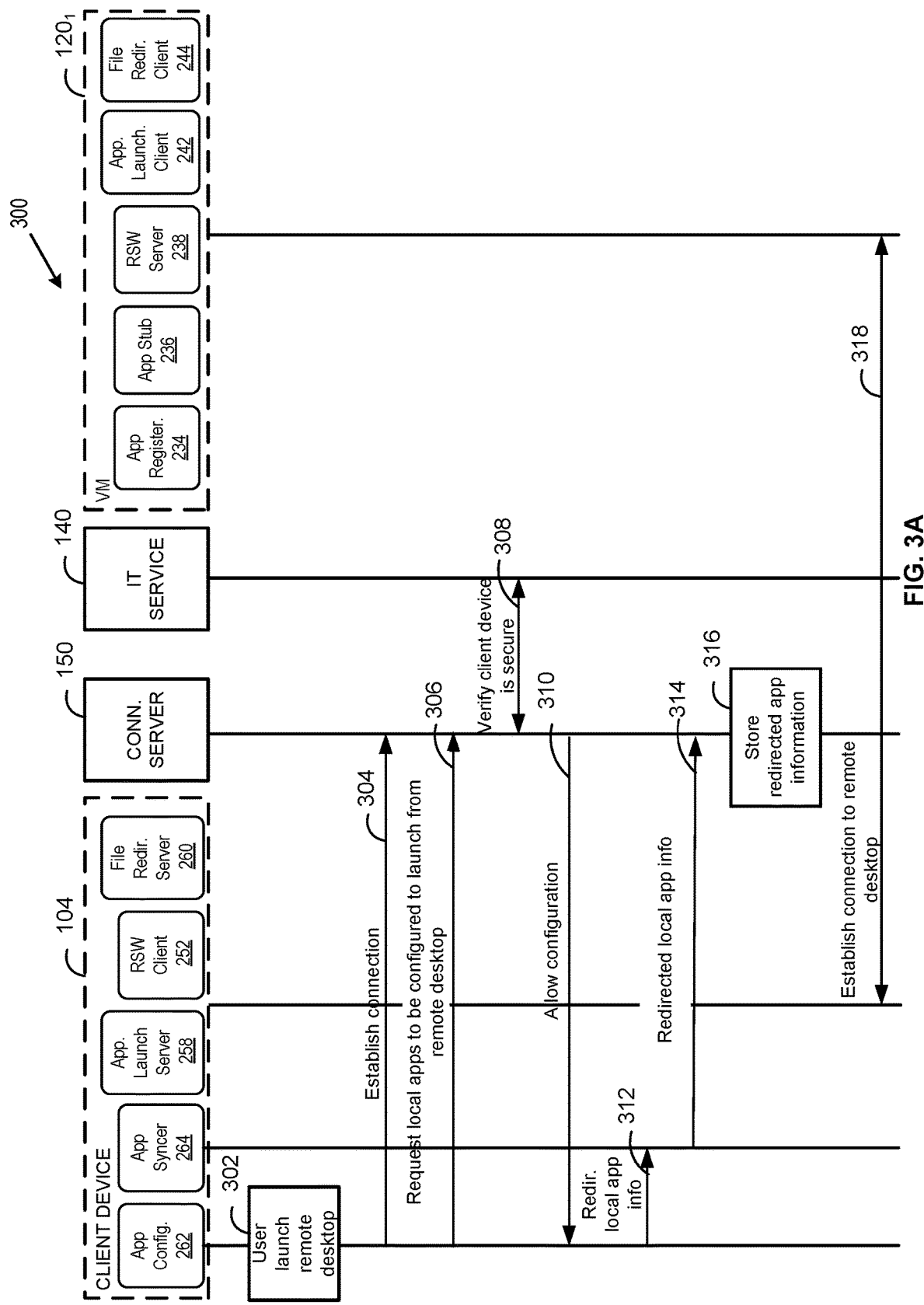
FIGS. 3A-3D illustrate a call flow diagram with example operations for launching local applications seamlessly from a remote desktop, according to an example embodiment of the present disclosure.

As shown in FIG. 3A, at operation 302, a user of client device 104 launches a remote desktop (e.g., running on VM 120$_1$). In some embodiments, the user may launch a remote desktop application on client device 104.

Before configuring one or more local applications of client device 104 to register with and be launched from within the remote desktop, client device 104 is first verified as valid device for security. At operation 304, application configurer 262 establishes a connection with connection server 150. At operation 306, application configurer 262 sends a request to connection server 150 to configure one or more local applications 133 to be registered and launched from within the remote desktop. Connection server 150 then communicates with IT service 140, at operation 308, to verify that client device 104 is a valid device (e.g., whether client device 104 is a device previously enrolled with IT service 140). Once client device 104 is verified by IT service 140, connection server 150 may send application configurer 262 a message, at operation 310, indicating the request to configure the one or more local applications is allowed.

At operation 312, application configurer 262 passes redirected local app information about the one or more local applications 133 to application syncer 264. The redirected local app information may include, for each of the one or more local applications 133 to be configured, the application name, the application path, the application version, the application icon, and/or the like.

At operation 314, application syncer 264 provides the redirected application information to connection server 150. In some embodiments, the redirected local app information is new redirected application information provided by application configurer 262. In some embodiments, the redirected local app information is updated redirected application information. For example, application syncer 264 may scan and monitor for changes to redirected local applications on client device 104 and send requests to connection server 150 to update existing redirected local app information stored by connection sever 150 if changes are found. Updates to the redirected local app information may be from upgrades to a redirected local application, uninstallation of a redirected local application, etc.

At operation 316, connection server 150 saves the redirected local app information. In some embodiments, local application holder 222 persists the redirected local app information to a non-volatile storage location.

At operation 318, client device 104 establishes a connection with the remote desktop. In some embodiments, remote connector 265 on client device 104 establishes a connection with agent server 237 on VM 120$_1$.

Figure 3B:
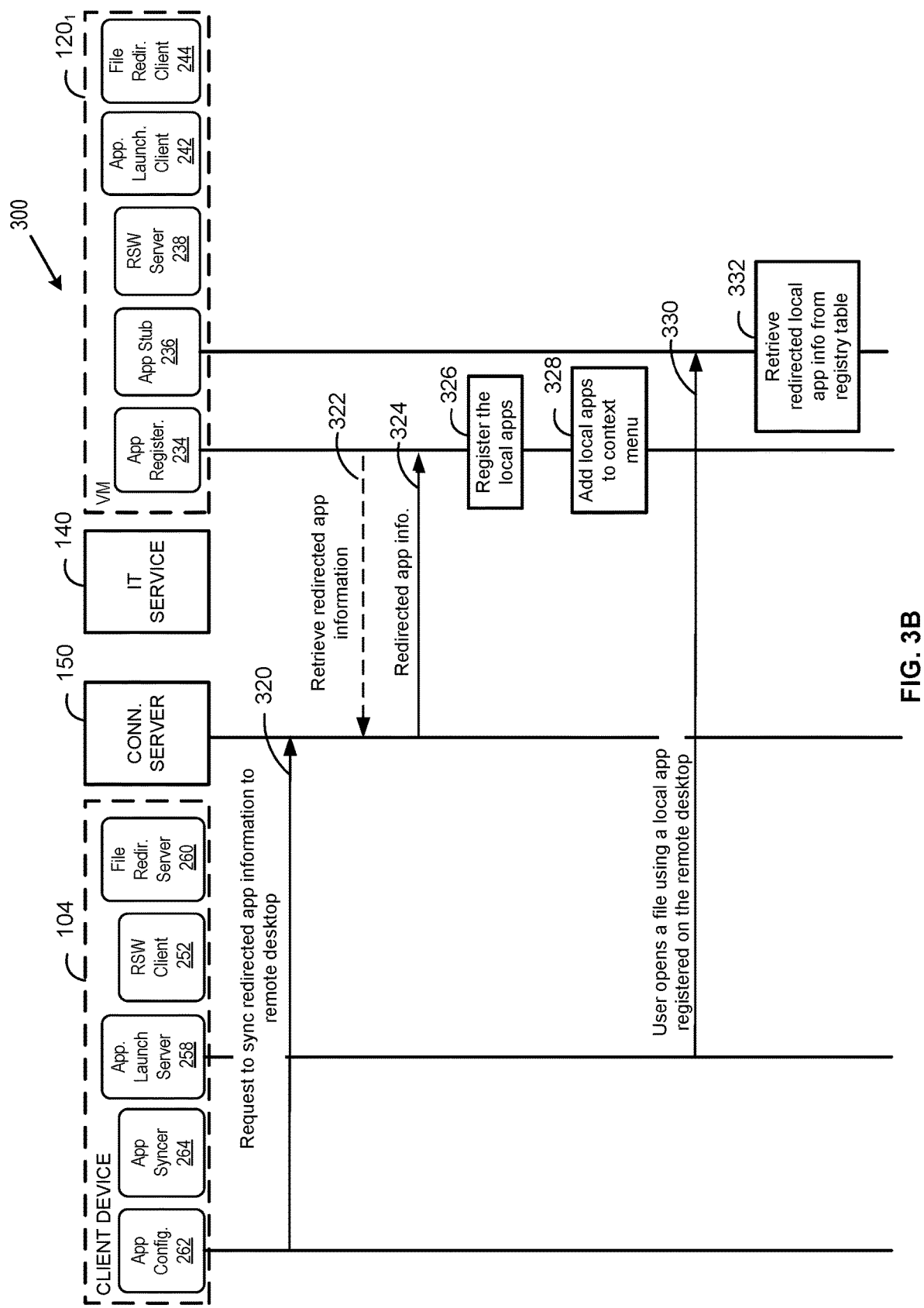

As shown in FIG. 3B, at operation 320, application configurer 262 can request connection server 150 to synchronize the redirected local app information to the remote desktop. In some embodiments, at operation 322, connection server 150 may receive a request from application register 234 on VM 120$_1$ to retrieve the redirected local app information from connection server 150. At operation 324, connection server 150 provides the redirected local app information to application register 234. In some embodiments, connection server 150 provides updates of the redirected local app information to application register 234.

At operation 326, application register 234 uses the redirected application information to register the one or more local applications of client device 104 with the remote desktop as the registered handler for one or more file types of one or more remote desktop files. Application register 234 may store the redirected local app information at registry table 232. In some embodiments, the redirected application information provided to application register 234 is new redirected local app information. In some embodiments, the redirected local app information provided to application register 234 updates (e.g., modifies, adds to, or deletes) existing redirected local app information stored at registry table 232 by application register 234.

Once registered, the one or more local applications 133 are added to a context menu of one or more remote desktop files of the one or more file types, at operation 328. From the context menu, the user can open a remote desktop file, at operation 330, using a registered local application 133. For example, one or more local applications 133 can be launched within the remote desktop window to handle a file. For example, when the user accesses (e.g., double-click or right-clicks with a mouse or touch pad operation) to the context menu of a file within the remote desktop window, the user may navigate to an "Open with" selection from the context menu for the file, where the one or more local applications are listed as selectable options.

Figure 4:
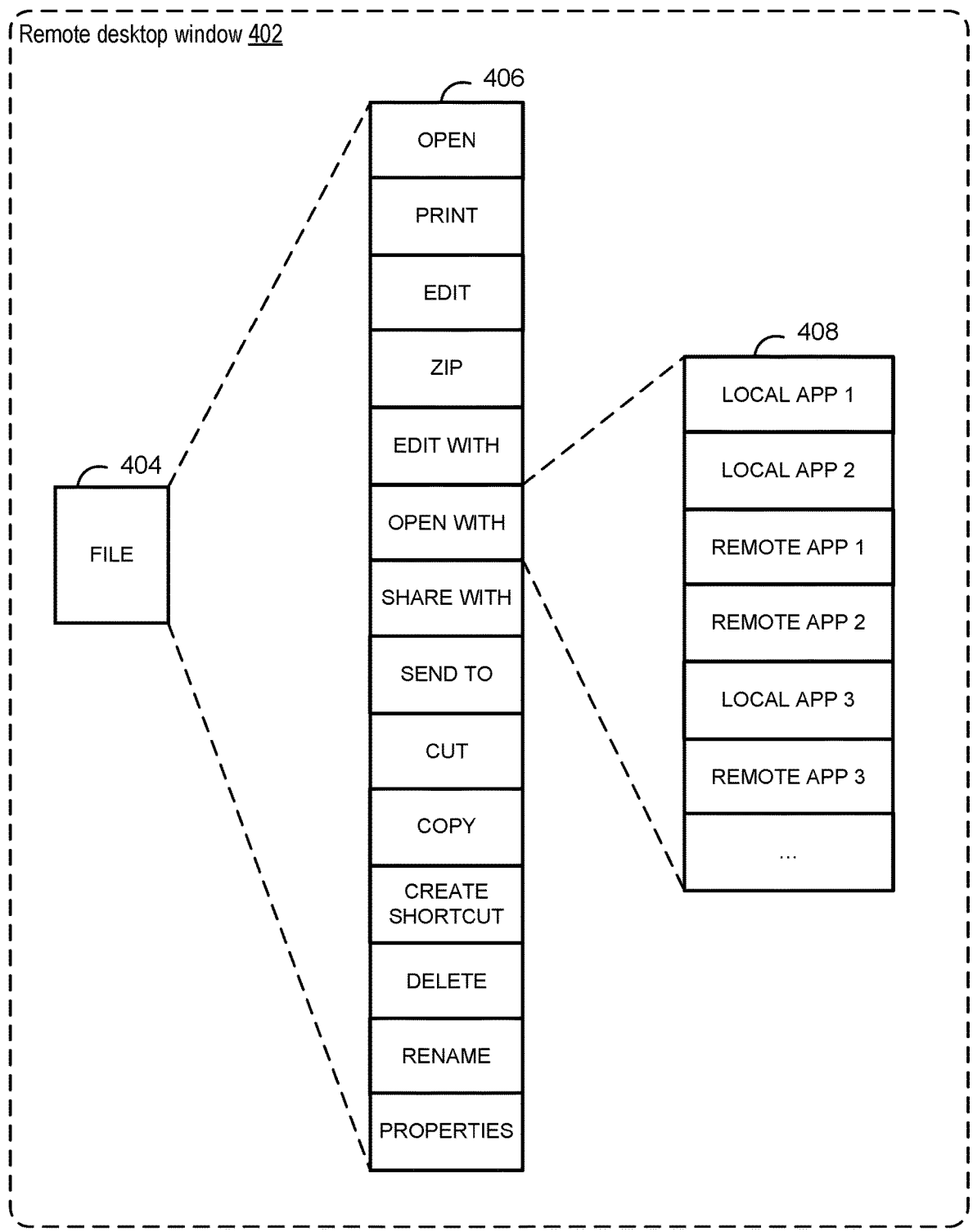
FIG. 4 depicts an example user interface (UI) for launching local applications seamlessly from a remote desktop, according to an example embodiment of the present disclosure.

FIG. 4 depicts an example user interface (UI) for launching local applications seamlessly on a remote desktop, according to an example embodiment of the present disclosure. As shown in FIG. 4, the user may view a remote desktop window 402 in a UI of client device 104. A file 404, e.g., a file icon, may appear in the remote desktop window 402. The user may access a context menu 406 of file 404, such as by double-clicking or right-clicking on file 404 with a mouse or touchpad operation (or a voice activation or other user input). As shown, context menu 406 may include a plurality of selectable actions for file 404. The user may navigate to a particular selection, e.g., "open with", which may access a second context menu 408 associated with the selection. As shown, second context menu 408 may include a plurality of selectable applications to open the remote desktop file. As shown, the plurality of selectable applications include local applications and remote desktop applications. Accordingly, at operation 330, the user can select a local application from the context menu for remote desktop file in the remote desktop window to open the remote desktop file with the local application.

Figure 3C:
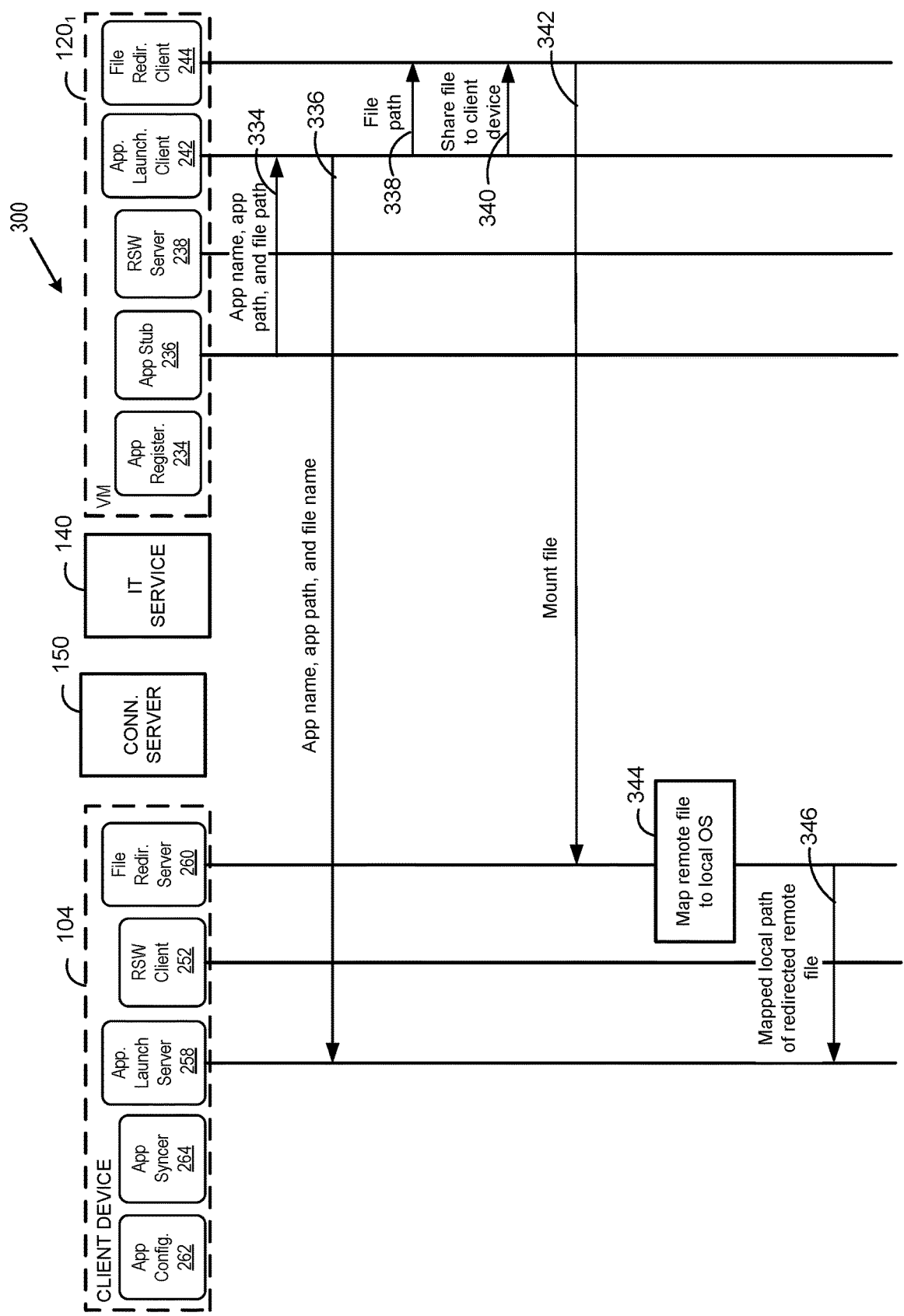
Figure 3D:
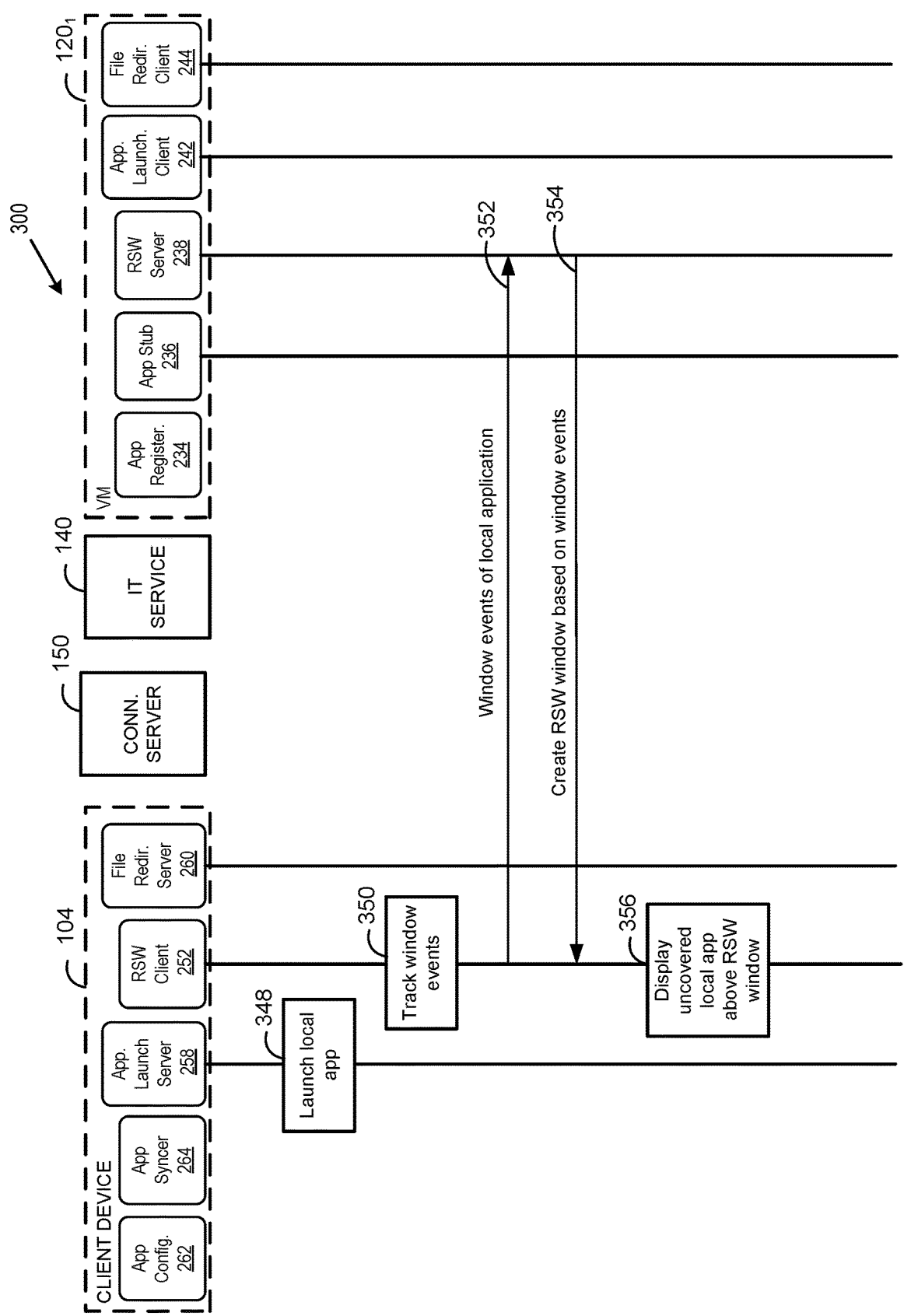

When the user selects open the remote desktop file with the local application, at operation 330, application stub process 236 informs application launch client 242 of the redirected local app information. In some embodiments, at operation 332, application stub process 236 retrieves the redirected local app information, associated with the selected local application 133, from registry table 232. As shown in FIG. 3C, at operation 334, application stub process 236 informs application launch client 242 of the application name, the application path, and the file path to initiate the reversed seamless window process.

At operation 336, application launch client 242 passes application launch server 258 the application name, application path, and file name. At operation 338, application launch client 242 passes file redirection client 244 the file path. At operation 340, application launch client 242 informs file redirection client 244 to share the specified local file with client device 104.

File redirection client 244 may redirect the file to file redirection server 260. At operation 342, file redirection client 244 mounts the file from the remote desktop to client device 104. File redirection client 244 can communicate with file redirection server 260 to map the remote desktop file to the local OS 132 of client device 104, at operation 344.

Once the remote desktop file is successfully mapped (shared) to local OS 132, file redirection server 260 informs application launch server 258 of the mapped file path at operation 346.

At operation 348, application launch server 258 launches the local application 133 selected by the user to open the remote desktop file. Application launch server launches the local application 133 using the application name and application path received from application launch client 242 and loads the mapped remote desktop file received from file redirection server 260.

RSW client 252 and RSW server 238 display the local application to the user in the remote desktop window as though it were an application installed on the remote desktop. When the local application is launched from within the remote desktop, RSW client 252 and RSW server 238 create a window for the corresponding visible local window and maintains the position and size of the RSW window the same as the corresponding local window. Accordingly, at operation 350, RSW client 252 (e.g., RSW service 254) tracks window events in local OS 132 of client device 104. At operation 352, RSW client 252 (e.g., RSW client plugin 256) sends window events to RSW server 238. RSW server 238 may send uncovered display portions to RSW client 252 at operation 354. When a RSW window is covered by another window on the remote desktop, the RSW window detects the uncovered display region and sends the uncovered display region to RSW server 238, which RSW server 238 forwards to RSW client 252 at operation 354. RSW client 252 may clip the local application window to only show the uncovered portion in the RSW window, at operation 356. Thus, local application 133 may be displayed to the user in a remote desktop window displayed on client device 104 as though the local application 133 were an application installed on the remote desktop.

Figure 5:
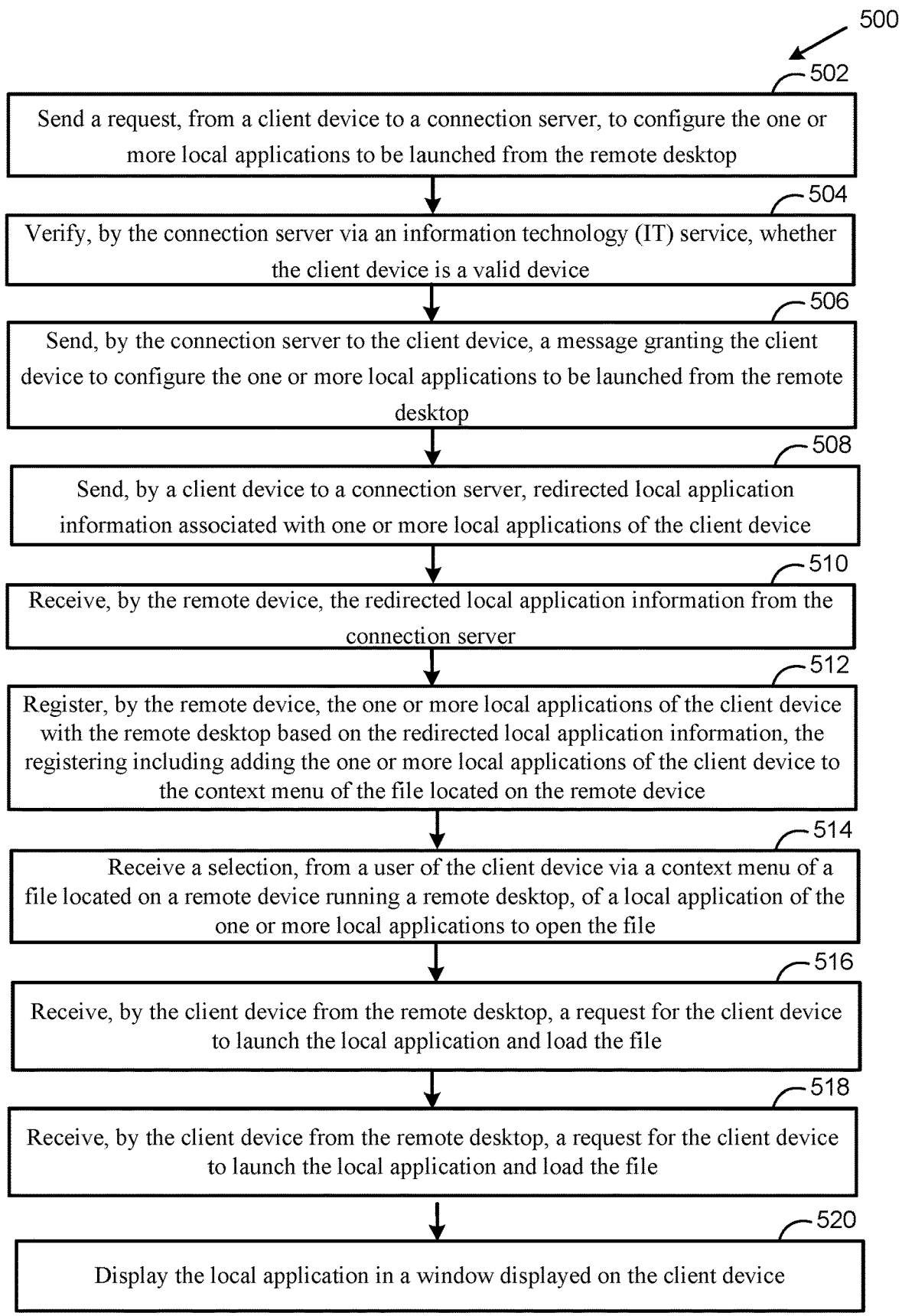
FIG. 5 is a flow diagram illustrating example operations for launching local applications seamlessly from a remote desktop, according to an example embodiment of the present application.

FIG. 5 is a flow diagram illustrating example operations 500 for launching local applications (e.g., one or more local applications 133 on client device 104) seamlessly from within a remote desktop (e.g., running on VM 120₁), according to an example embodiment of the present application.

At operation 502, the client device may send a request to a connection server (e.g., connection server 150) to configure one or more local applications to be launched from within a remote desktop. At operation 504, the connection server may verify, via an IT service (e.g., IT service 140), whether the client device is a valid device. At operation 506, the connection server may send to the client device a message granting the client device to configure the one or more local applications to be launched from within the remote desktop.

At operation 508, the client device may send to the connection server, redirected local application information associated with one or more local applications of the client device. The redirected local application information may include an application name of each of the one or more local applications, an application path of each of the one or more local applications, or a combination thereof.

At operation 510, the remote device receives the redirected local application information from the connection server. At operation 512, the remote device registers the one or more local applications of the client device with the remote desktop based on the redirected local application information, the registering including adding the one or more local applications of the client device to the context menu of the file located on the remote device.

At operation 514, the client receives a selection from a user of the client device, via a context menu (e.g., context menu 408) of a file (e.g., file 404) located on a remote device (e.g., host 105) running a remote desktop, a local application of the one or more local applications to open the file.

At operation 516, the client device receives from the remote desktop, a request for the client device to launch the local application and load the file.

At operation 518, in response to the selecting, the remote device sends, to the client device, at least a portion of the redirected local application information associated with the selected local application and a file name of the file located on the remote device. The client device may map the file associated with the file name to a disk of the client device. The client device may use the portion of the redirected local application information associated the selected local application and a file path of the mapped file to open the file using the selected local application.

At operation 520, the client device displays the local application in a window displayed on the client device. The client device may track window events associated with the local application and send, to the remote device, the window events. The remote device may send, to the client device, uncovered display portions associated with the window event. The client device may display the uncovered display portions in the window of the remote desktop displayed on the client device.

Accordingly, techniques presented herein for launching one or more local applications seamlessly from within a remote desktop window. The techniques provided herein may provide seamless remote working experience for users working with both remote desktop applications and local applications. Aspects may remove the need for a user to switch between remote desktop windows and local desktop windows, thereby saving time and improving user productivity. Aspects allow a user to use local applications to open documents located on the remote desktop without the user transferring the file between the local desktop and remote desktop.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of seamlessly launching one or more local applications from a remote desktop, the method comprising:
receiving, at a client device from a user or administrator of the client device via a user interface (UI), input selecting one or more local applications to be registered at the remote desktop;
in response to the input selecting the one or more local applications to be registered, sending, from the client device to a connection server, redirected local application information associated with the one or more local applications of the client device;
receiving, by a remote device running the remote desktop, the redirected local application information from the connection server;
registering, by the remote device, the one or more local applications of the client device with the remote desktop based on the redirected local application information, the registering including adding the one or more local applications of the client device to a context menu of a file located on the remote device;

receiving a selection, from the user of the client device via the context menu displayed in a remote desktop window displayed on the client device, of the file located on the remote device running the remote desktop, of a local application of the one or more local applications to open the file;

in response to receiving the selection of the local application of the one or more local applications to open the file, receiving, by the client device from the remote desktop, a request for the client device to launch the local application and load the file; and in response to receiving the request from the remote desktop, displaying the local application in the remote desktop window displayed on the client device.

2. The method of claim 1, wherein the redirected local application information comprises an application name of each of the one or more local applications, an application path of each of the one or more local applications, or a combination thereof.

3. The method of claim 1, further comprising:
sending a request, from the client device to the connection server, to configure the one or more local applications to be launched from the remote desktop;
in response to the request, verifying, by the connection server via an information technology (IT) service, whether the client device is a valid device; and
sending, by the connection server to the client device, a message granting the client device to configure the one or more local applications to be launched from the remote desktop, wherein the redirected local application information is received in response to the message.

4. The method of claim 1, further comprising:
in response to receiving the selection, sending, by the remote device to the client device, at least a portion of the redirected local application information associated with the selected local application and a file name of the file located on the remote device.

5. The method of claim 4, further comprising:
mapping, by the client device, the file associated with the file name to a disk of the client device; and
using, by the client device, the portion of the redirected local application information associated the selected local application and a file path of the mapped file to open the file using the selected local application.

6. The method of claim 1, wherein displaying the local application in the remote desktop window displayed on the client device comprises:
tracking, by the client device, window events associated with the local application;
sending, by the client device to the remote device, the window events;
receiving, at the client device from the remote device, uncovered display portions associated with the window event; and
displaying the uncovered display portions in the remote desktop window displayed on the client device.

7. A system comprising:
a user interface (UI);
one or more processors; and
at least one memory, the one or more processors and the at least one memory configured to:

receive, at a client device from a user or administrator of the client device via the UI, input selecting one or more local applications to be registered at a remote desktop;

in response to the input selecting the one or more local applications to be registered, send, from the client device to a connection server, redirected local application information associated with the one or more local applications of the client device;

receive, by a remote device running the remote desktop, the redirected local application information from the connection server;

register, by the remote device, the one or more local applications of the client device with the remote desktop based on the redirected local application information, the registering including adding the one or more local applications of the client device to a context menu of a file located on the remote device;

receive a selection, from the user of the client device via the context menu displayed in a remote desktop window displayed on the client device, of the file located on the remote device running the remote desktop, of a local application of the one or more local applications to open the file;

in response to receiving the selection of the local application of the one or more local applications to open the file, receive, by the client device from the remote desktop, a request for the client device to launch the local application and load the file; and in response to receiving the request from the remote desktop, display the local application in the remote desktop window displayed on the client device.

8. The system of claim 7, wherein the redirected local application information comprises an application name of each of the one or more local applications, an application path of each of the one or more local applications, or a combination thereof.

9. The system of claim 7, wherein the one or more processors and the at least one memory are further configured to:
send a request, from the client device to the connection server, to configure the one or more local applications to be launched from the remote desktop;
in response to the request, verify, at the connection server via an information technology (IT) service, whether the client device is a valid device; and
send, from the connection server to the client device, a message granting the client device to configure the one or more local applications to be launched from the remote desktop, wherein the redirected local application information is received in response to the message.

10. The system of claim 7, wherein the one or more processors and the at least one memory are configured to, in response to the selection, send, from the remote device to the client device, at least a portion of the redirected local application information associated with the selected local application and a file name of the file located on the remote device.

11. The system of claim 10, wherein the one or more processors and the at least one memory are further configured to:
map, at the client device, the file associated with the file name to a disk of the client device; and
use, at the client device, the portion of the redirected local application information associated the selected local application and a file path of the mapped file to open the file using the selected local application.

12. The system of claim 7, wherein the one or more processors and the at least one memory are configured to display the local application in the remote desktop window displayed on the client device by:
- tracking, at the client device, window events associated with the local application;
- sending, from the client device to the remote device, the window events;
- receiving, at the client device from the remote device, uncovered display portions associated with the window event; and
- displaying the uncovered display portions in the remote desktop window displayed on the client device.

13. A non-transitory computer-readable medium comprising instructions that, when executed by one or more processors of a computing system, cause the computing system to perform operations for seamlessly launching one or more local applications from a remote desktop, the operations comprising:
- receiving, at a client device from a user or administrator of the client device via a user interface (UI), input selecting one or more local applications to be registered at the remote desktop;
- in response to the input selecting the one or more local applications to be registered, sending, from the client device to a connection server, redirected local application information associated with the one or more local applications of the client device;
- receiving, by a remote device running the remote desktop, the redirected local application information from the connection server;
- registering, by the remote device, the one or more local applications of the client device with the remote desktop based on the redirected local application information, the registering including adding the one or more local applications of the client device to a context menu of a file located on the remote device;
- receiving a selection, from the user of the client device via the context menu displayed in a remote desktop window displayed on the client device, of the file located on the remote device running the remote desktop, of a local application of the one or more local applications to open the file;
- in response to receiving the selection of the local application of the one or more local applications to open the file, receiving, by the client device from the remote desktop, a request for the client device to launch the local application and load the file; and
- in response to receiving the request from the remote desktop, displaying the local application in the remote desktop window displayed on the client device.

14. The non-transitory computer-readable medium of claim 13, wherein the redirected local application information comprises an application name of each of the one or more local applications, an application path of each of the one or more local applications, or a combination thereof.

15. The non-transitory computer-readable medium of claim 13, the operations further comprising:
- sending a request, from the client device to the connection server, to configure the one or more local applications to be launched from the remote desktop;
- in response to the request, verifying, by the connection server via an information technology (IT) service, whether the client device is a valid device; and
- sending, by the connection server to the client device, a message granting the client device to configure the one or more local applications to be launched from the remote desktop, wherein the redirected local application information is received in response to the message.

16. The non-transitory computer-readable medium of claim 13, the operations further comprising:
- in response to receiving the selection, sending, by the remote device to the client device, at least a portion of the redirected local application information associated with the selected local application and a file name of the file located on the remote device.

17. The non-transitory computer-readable medium of claim 16, the operations further comprising:
- mapping, by the client device, the file associated with the file name to a disk of the client device; and
- using, by the client device, the portion of the redirected local application information associated the selected local application and a file path of the mapped file to open the file using the selected local application.

\* \* \* \* \*